UNITED STATES PATENT OFFICE.

CHARLES REID BOGGS, OF ARLINGTON HEIGHTS, MASSACHUSETTS, ASSIGNOR TO SIMPLEX WIRE & CABLE CO., OF BOSTON, MASSACHUSETTS, A CORPORATION OF MASSACHUSETTS.

ACCELERATOR FOR THE VULCANIZATION OF RUBBER.

1,296,469.   Specification of Letters Patent.   Patented Mar. 4, 1919.

No Drawing.   Application filed March 16, 1914.   Serial No. 824,950.

*To all whom it may concern:*

Be it known that I, CHARLES REID BOGGS, a citizen of the United States, and resident of Arlington Heights, in the county of Middlesex and State of Massachusetts, have invented an Improvement in Accelerators for the Vulcanization of Rubber, of which the following description is a specification.

In the process of vulcanizing rubber, it is important that the rubber either have contained therein sufficient mineral or organic matter to hasten and assist the vulcanizing process, or that some mixture which will act as an accelerating agent during the vulcanizing process be employed. Also the addition of some accelerating agent is usually desirable to hasten the vulcanization and to improve the resulting product. This use of an accelerator is particularly important in the case of the lower grades of wild and plantation rubbers, as well as with reclaimed or regenerated rubber. Furthermore, in the vulcanization of synthetic or artificial rubber and its homologues, it is of course necessary and important to add an accelerator to assist in the vulcanization of this type of rubber, as synthetic rubber, from its method of manufacture, is practically a pure rubber product and is entirely free from those impurities impregnating the best wild rubber, which natural impurities or fillers act as accelerators.

I have discovered that vulcanized rubber and the products made therefrom are greatly improved by the use of accelerators for the vulcanization, consisting of either primary or secondary amins, and that their use also materially shortens the time heretofore required in the vulcanizing process. I have used primary and secondary amins of the aliphatic or aromatic series as well as of other ring structure, either homocyclic or heterocyclic, and whether composed of one ring or condensed rings, with successful results. However, I prefer to employ amins of the aromatic series or other ring structure, such for example as para-phenylenediamin, and beta-naphthylamin, or their reacting compounds. I have also discovered that the action of such accelerators is effective whether sulfur, selenium, as set forth in my co-pending application Serial No. 824,951, filed March 16, 1914, or any present types of vulcanizing agents are used, and these accelerators may be employed with equal advantage whether hard or soft vulcanized rubber is being made. While I have successfully employed such primary and secondary amins as accelerators on various grades of rubber, with equal success, I am not, at present, positive that they also act as catalyzers. However, I believe that the action is not only somewhat catalytic in respect to the vulcanization, but also has an effect on the degree of polymerization of the rubber. This theory is further substantiated by the fact that heat applied either externally or internally by other means does not produce the same result. These amins may be the active vulcanizing accelerators; or their reaction products may constitute the actual vulcanizing accelerator with sulfur or other vulcanizing agent in the rubber, together with a hydrogen sulfid absorber, such for example as litharge. However, I also find that in many cases, litharge has no appreciable effect, and therefore do not wish to be understood as being limited to either use or omit such an absorber.

In practice, I find that the resulting product, whether hard or soft vulcanized rubber, is greatly improved as to all the physical tests and lasting qualities, such physical tests being as to tensile strength, elasticity, resiliency, and the lasting qualities or "life" of the rubber product.

Furthermore, I have discovered that the use of these amins substantially prevents, or greatly lessens, the amount of depolymerization of the rubber product, when subjected to heat or a similar depolymerizative agent. I believe it to be a distinct novelty in the art of rubber vulcanization to use primary or secondary amins of the aliphatic or aromatic series, or other ring structures, as above explained, as an accelerator for the vulcanization of rubber, and I therefore wish to claim the same broadly. Also the use of these amins materially shortens the time heretofore required for vulcanization, while producing an equally valuable product, or increases the physical tests and enduring qualities of the product where the time and temperature of vulcanization as ordinarily practised is the same.

In carrying out my invention, I have found that a wide range of proportions and constituents may be employed, but the following have been found especially practicable and commercially satisfactory, viz:

One hundred parts of deresinated pontianak, twenty-five parts litharge, four parts beta-naphthylamin, six parts sulfur, four parts paraffin, and one hundred and ninety parts of zinc oxid and whiting in suitable proportions are mixed together and vulcanized for one hour at 275 degrees F. As the whiting and zinc oxid are inert materials, it makes but little difference in what proportions they are used, although I find a suitable admixture is 140 parts of whiting and 50 parts of zinc, making a total of 190 parts, as above mentioned. This mixture will test as well as a similar Pará rubber compound, and will show an increase of 47% of the tensile strength and 11% of the ultimate elongation when compared with the same compound without the accelerator.

The above compound made with a low grade of plantation hevea rubber, in place of the pontianak, will test as well as a similar Pará rubber compound, and will show an increase of 30% of the tensile strength and 17% of the ultimate elongation when compared with the same compound without the accelerator.

It will be understood that I do not mean to limit my invention to the particular formula or kinds of rubber above mentioned, but wish it understood that I may apply the same to any of the wide variety of mixtures and compounds of rubber, used in commercial articles. It is well known that, in the manufacture of rubber articles it is customary to mix various kinds of rubber and different proportions of each, and my accelerators may be advantageously employed with any of the commercial mixtures of rubber. Also the accelerators I have explained above may be advantageously employed with the different mineral and organic fillers in the rubber as well as in the vulcanization of synthetic rubber. Furthermore a mixture of my accelerators with other sorts of accelerators may be employed satisfactorily resulting in a greatly improved vulcanized product.

In the present application I have explained both my process and the agent utilized therein, and wish to claim the agent and the resulting product, reserving the claims on the process for a divisional application.

Having described my invention, what I claim as new and desire to secure by Letters Patent is:

As an article of manufacture, vulcanized rubber containing before vulcanization rubber and beta-napthylamin.

In testimony whereof I have signed my name to this specification in the presence of two subscribing witnesses.

CHARLES REID BOGGS.

Witnesses:
HENRY WAITE BIGELOW,
AGNES BERNICE GRIFFIN.